United States Patent
Cartwright

(10) Patent No.: US 12,463,515 B2
(45) Date of Patent: Nov. 4, 2025

(54) GAS TURBINE ENGINE

(71) Applicant: Rolls-Royce plc, London (GB)

(72) Inventor: Matthew S Cartwright, Derby (GB)

(73) Assignee: ROLLS-ROYCE plc, London (GB)

(*) Notice: Subject to any disclaimer, the term of this patent is extended or adjusted under 35 U.S.C. 154(b) by 0 days.

(21) Appl. No.: 19/063,592

(22) Filed: Feb. 26, 2025

(65) Prior Publication Data
US 2025/0293575 A1   Sep. 18, 2025

(30) Foreign Application Priority Data
Mar. 12, 2024   (GB) ..................................... 2403522

(51) Int. Cl.
| | |
|---|---|
| *H02K 21/02* | (2006.01) |
| *F02C 6/20* | (2006.01) |
| *F02C 7/32* | (2006.01) |
| *H02K 7/18* | (2006.01) |

(52) U.S. Cl.
CPC ............ *H02K 21/023* (2013.01); *F02C 6/20* (2013.01); *F02C 7/32* (2013.01); *H02K 7/1823* (2013.01); *H02K 2213/09* (2013.01)

(58) Field of Classification Search
CPC ............. H02K 21/023; H02K 7/1823; H02K 2213/09; F02C 6/20; F02C 7/32
See application file for complete search history.

(56) References Cited

U.S. PATENT DOCUMENTS

2013/0020888 A1* 1/2013 Anthony ................ H02K 1/141
                                                                      310/52
2013/0047626 A1    2/2013 Merry et al.

FOREIGN PATENT DOCUMENTS

| CA | 2676586 A1 | 5/2010 |
| CN | 113972805 A | 1/2022 |
| EP | 3667042 A2 | 6/2020 |

* cited by examiner

*Primary Examiner* — Joseph Ortega
(74) *Attorney, Agent, or Firm* — Oliff PLC

(57) ABSTRACT

A gas turbine engine includes: first spool including first compressor and first turbine drivingly coupled by first main shaft; second spool including a second compressor and second turbine drivingly coupled by second main shaft; combustion equipment; electrical machine arrangement including: first rotor drivingly coupled to first main shaft and carrying array of rotor elements; second rotor drivingly coupled to second main shaft and carrying array of rotor elements; and stator arrangement including array of stator coils arranged around an axis, axis being coaxial with an axis of rotation of first rotor and an axis of rotation of second rotor. Stator arrangement is axially translatable relative to first and second rotors, between: a first axial position in which array of stator coils interacts with array of rotor elements of first rotor; and a second axial position in which array of stator coils interacts with array of rotor elements of second rotor.

20 Claims, 7 Drawing Sheets

GAS TURBINE ENGINE

This disclosure claims the benefit of UK Patent Application No. GB 2403522.2 filed on 12 Mar. 2024, which is hereby incorporated herein in its entirety.

BACKGROUND

Technical Field

The present disclosure concerns an aircraft gas turbine engine comprising an electrical machine arrangement.

Background of the Disclosure

Aircraft gas turbine engines typically have a high-pressure (HP) spool, a low-pressure (LP) spool and, in some cases, an intermediate-pressure (IP) spool. To facilitate engine starting, one of the spools, often the HP spool, may be coupled to an electrical machine that, when supplied with electrical power, drives rotation of the spool to increase its speed towards a starting speed. After the engine is started, the electrical machine can be redeployed as a generator to generate electrical power from the spool, to supply engine and/or aircraft electrical loads. Such an electrical machine is known as a starter-generator.

More recently, aircraft gas turbine engines with so-called "dual-spool" power offtake have been proposed. In these engines, electrical machines are coupled to each of the HP spool and one of the LP or IP spools. The electrical machine of the HP spool is primarily used for engine starting, as the HP spool is usually the designated starting spool. The electrical machine of the LP/IP spool is primarily used for electrical power generation, reducing the amount of power offtake from the HP spool which can otherwise impact, e.g., surge margin and turbine temperature.

While the provision of electrical machines for two spools of the gas turbine engine helps improve engine operability while retaining the electric start functionality, it increases, e.g., the amount of power conversion hardware and cabling.

SUMMARY

According to a first aspect, there is an aircraft gas turbine engine, comprising:
  a first spool comprising a first compressor and a first turbine drivingly coupled by a first main shaft;
  a second spool comprising a second compressor and a second turbine drivingly coupled by a second main shaft;
  combustion equipment;
  an electrical machine arrangement comprising:
    a first rotor drivingly coupled to the first main shaft and carrying an array of rotor elements;
    a second rotor drivingly coupled to the second main shaft and carrying an array of rotor elements; and
    a stator arrangement comprising an array of stator coils arranged around an axis, the axis being coaxial with an axis of rotation of the first rotor and an axis of rotation of the second rotor,
  wherein the stator arrangement is axially translatable relative to the first and second rotors between:
    a first axial position in which the array of stator coils interacts with the array of rotor elements of the first rotor; and
    a second axial position in which the array of stator coils interacts with the array of rotor elements of the second rotor.

In an embodiment, in the first axial position, the array of stator coils is radially aligned with the array of rotor elements of the first rotor, and in the second axial position, the array of stator coils is radially aligned with the array of rotor elements of the second rotor.

In an embodiment, the electrical machine arrangement comprises an axially translating carriage, wherein the stator arrangement is fixed relative to the carriage.

In an embodiment, an axial position of the stator arrangement is fixed, and the first and second rotors are axially translatable along the first and second axes of rotation.

In an embodiment, the array of stator coils comprises a plurality of electrically isolated polyphase winding sets.

In an embodiment, the array of stator coils comprises two or four electrically isolated polyphase winding sets.

In an embodiment, a circumference of the stator arrangement is divided into a plurality of sectors and each one of the plurality of electrically isolated polyphase winding sets occupies a respective one of the plurality of sectors.

In an embodiment, a first polyphase winding set of the plurality of polyphase winding sets is electrically connected to first DC power channel, and a second polyphase winding set of the plurality of polyphase winding sets is electrically connected to second DC power channel.

In an embodiment, the first rotor carries a first array of rotor elements and a second array of rotor elements axially spaced from the first array of rotor elements; the second rotor carries a third array of rotor elements and a fourth array of rotor elements axially spaced from the third array of rotor elements; the array of stator coils is a first array of stator coils, and the stator arrangement further comprises a second array of stator coils arranged around the axis and axially spaced from the first array of stator coils. In the first axial position, the first array of stator coils interacts with the first array of rotor elements, and the second array of stator coils interacts with the second array of rotor elements. In the second axial position, the first array of stator coils interacts with the third array of rotor elements, and the second array of stator coils interacts with the fourth array of rotor elements.

In an embodiment, the stator arrangement is axially translatable relative to the first and second rotors to: a third axial position axially between the first and second axial positions, in which the first array of stator coils interacts with the second array of rotor elements, and the second array of stator coils interacts with the third array of rotor elements.

In an embodiment, the first array of stator coils is electrically connected to a first DC power channel; and the second array of stator coils is electrically connected to a second DC power channel.

In an embodiment, the first array of stator coils comprises first and second electrically isolated polyphase winding sets; and the second array of stator coils comprises third and fourth electrically isolated polyphase winding sets.

In an embodiment, the first and second polyphase winding sets are electrically connected to a first DC power channel; and the third and fourth polyphase winding sets are electrically connected to a second DC power channel.

In an embodiment, the first and fourth polyphase winding sets are electrically connected to a first DC power channel; and the second and third polyphase winding sets are electrically connected to a second DC power channel.

In an embodiment the rotor elements are permanent magnets.

In an embodiment, the rotor elements are rotor windings.

In an embodiment, the gas turbine engine further comprises a controller configured to control the axial position of the stator arrangement relative to the first and second rotors.

In an embodiment, the controller is configured to monitor one or more operating conditions of the gas turbine engine and to select an axial position based on the one or more operating conditions.

The controller may take any suitable form, and may be implemented in hardware, software or a combination of the two. In an embodiment, the controller is or is part of a Full Authority Digital Engine Controller (FADEC). In another embodiment, the controller is or is part of an electrical power management system, e.g., as part of a vehicle management system.

In an embodiment, the first rotor is drivingly coupled to the first main shaft via a first radial drive shaft; the second rotor is drivingly coupled to the second main shaft via a second radial drive shaft.

In an embodiment, the second rotor is drivingly coupled to the second radial drive shaft via an accessory gearbox.

In an embodiment, the first spool is a low-pressure (LP) spool or an intermediate-pressure (IP) spool; and the second spool is a high-pressure (HP) spool.

According to a second aspect, there is an aircraft comprising the gas turbine engine of the first aspect.

According to a third aspect, the electrical machine arrangement is provided separately. The electrical machine arrangement comprises:
 a first rotor configured to be coupled to a first main shaft of a gas turbine engine and carrying an array of rotor elements;
 a second rotor configured to be coupled to a second main shaft of the gas turbine engine and carrying an array of rotor elements; and
 a stator arrangement comprising an array of stator coils arranged around an axis, the axis being coaxial with an axis of rotation of the first rotor and an axis of rotation of the second rotor,
 wherein the stator arrangement is axially translatable relative to the first and second rotors between:
  a first axial position in which the array of stator coils interacts with the array of rotor elements of the first rotor; and
  a second axial position in which the array of stator coils interacts with the array of rotor elements of the second rotor.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
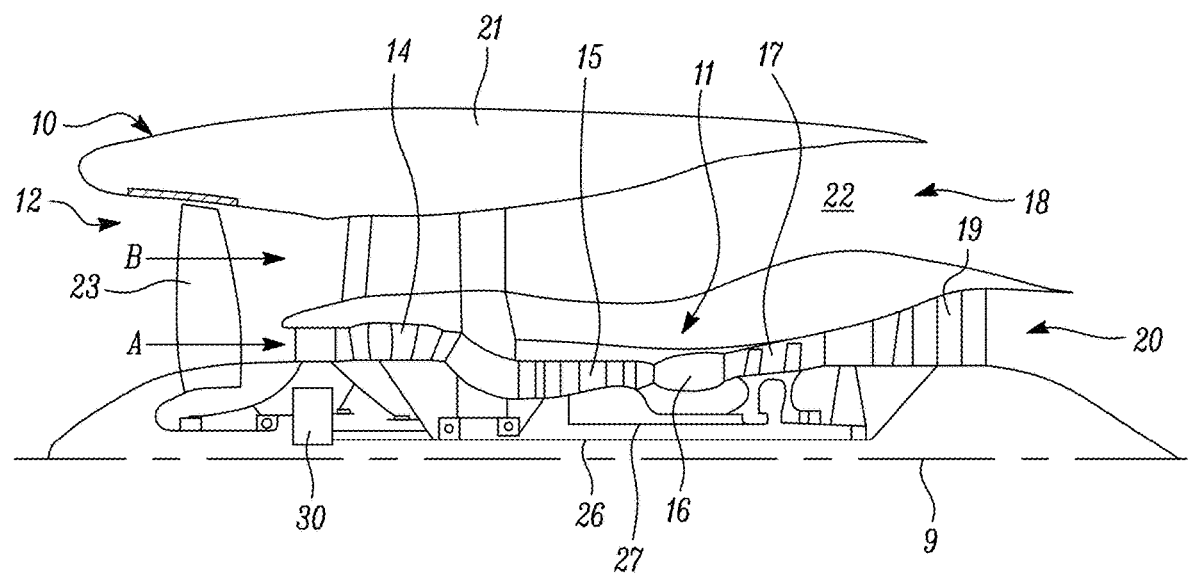
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure (LP) compressor 14, a high-pressure (HP) compressor 15, combustion equipment 16, an HP turbine 17, a LP turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the LP turbine 19 via a shaft 26 and an epicyclic gearbox 30.

In use, the core airflow A is accelerated and compressed by the LP compressor 14 and directed into the HP compressor 15 where further compression takes place. The compressed air exhausted from the HP compressor 15 is directed into the combustion equipment 16 where it is mixed with fuel and the mixture is combusted. The resultant hot combustion products then expand through, and thereby drive, the HP and LP turbines 17, 19 before being exhausted through the core exhaust nozzle 20 to provide some propulsive thrust. The HP turbine 17 drives the HP compressor 15 by a suitable interconnecting shaft 27. The fan 23 generally provides the majority of the propulsive thrust. The epicyclic gearbox 30 is a reduction gearbox. In other arrangements, the gas turbine engine 10 may not comprise a gearbox 30.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

Figure 2:
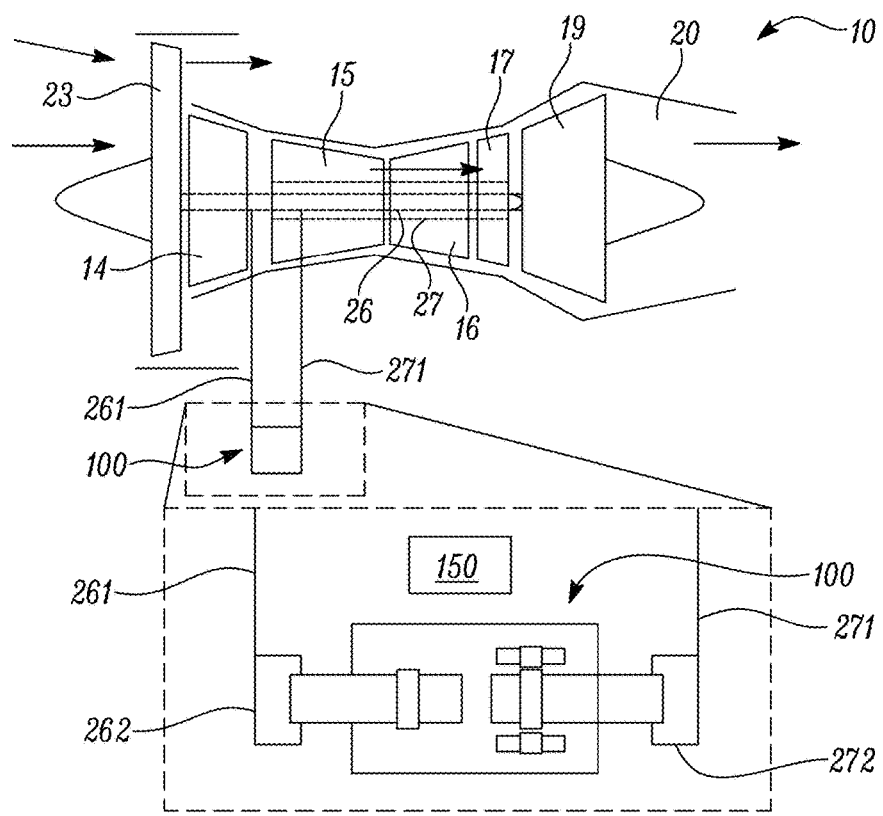
FIG. 2 is a sectional view of a gas turbine engine comprising an electrical machine arrangement.

FIG. 2 illustrates a gas turbine engine 10 in accordance with the present disclosure. The gas turbine engine 10 of FIG. 2 is of the same general configuration as that of FIG. 1, albeit without a gearbox 30, and like reference numbers are used to indicate like features. The gas turbine engine 10 of FIG. 2 further includes an electrical machine arrangement 100. The electrical machine arrangement 100 is drivingly coupled to the LP shaft 26 via a first mechanical power offtake 261, shown in the form of a radial drive shaft (RDS). The electrical machine arrangement 100 is drivingly coupled to the HP shaft 27 via a second mechanical power offtake 262, again in the form of an RDS. The connection between the electrical machine arrangement 100 and the power offtakes 261, 262 may be made by meshing gear sets 262, 272, or by one or more accessory gearboxes having available drive pads.

Figure 3A:
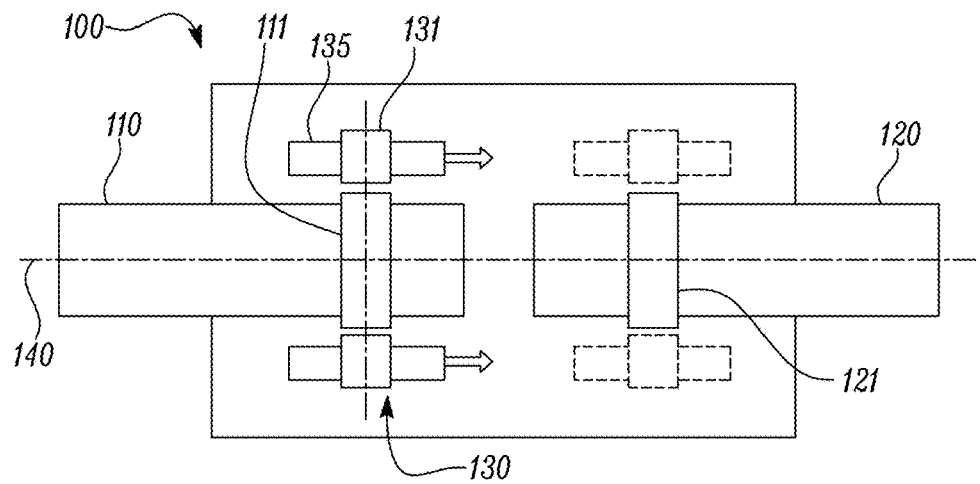
FIG. 3A is partially schematic and sectional side view of an electrical machine arrangement with a stator arrangement in a first axial position.
Figure 3B:
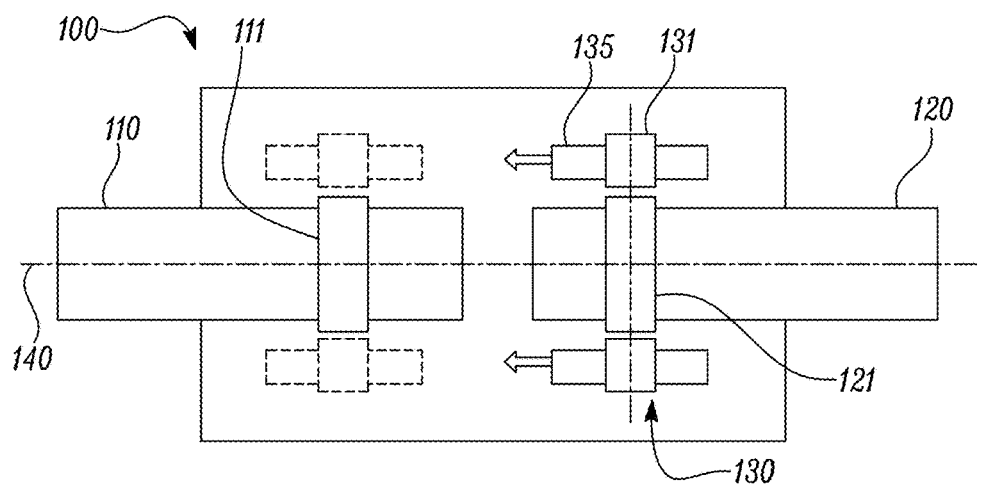
FIG. 3B shows the electrical machine arrangement of FIG. 3A with the stator arrangement in a second axial position.

FIGS. 3A and 3B illustrate a first example of the electrical machine arrangement 100 of FIG. 2. FIGS. 3A and 3B show the same electrical machine arrangement 100 and differ only in the axial position of a stator arrangement 130 which, as described below, can be changed in use so that a shaft of the gas turbine engine 10 to which the electrical machine arrangement 100 is coupled can be changed. The electrical machine arrangement 100, or the wider gas turbine engine 10, may have a controller 150 (see FIG. 2) for controlling the axial position of the stator arrangement.

The electrical machine arrangement 100 includes a first rotor 110 and a second rotor 120. The first rotor 110 is drivingly coupled to a first spool of the gas turbine engine (e.g., the LP or IP spool) and the second rotor 120 is drivingly coupled to a second spool of the gas turbine engine (e.g., the HP spool). As noted above, the coupling between the rotors 110, 120 and the engine spools may be made through power offtakes 261, 262 and, for example, meshing gear sets 262, 272.

The rotors 110, 120 have coaxial axes of rotation 140 and are axially spaced apart. A radially outer side (e.g., surface) of the first rotor 110 carries an array of electrical machine rotor elements 111, arranged around the axis of rotation 140. Likewise, a radially outer side (e.g., surface) of the second rotor 120 carries an array of electrical machine rotor elements 121, arranged around the axis of rotation 140. In one example, the rotor elements 111, 121 are permanent magnets. In another example, the rotor elements 111, 121 are rotor coils, the connections to which may be located within a hollow interior of the respective rotor 110, 120.

Figure 5A:
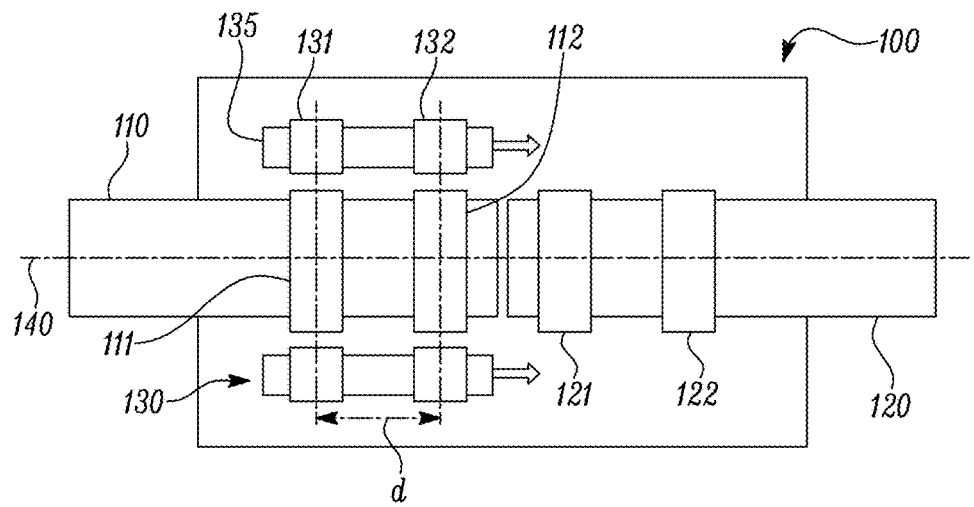
FIG. 5A is partially schematic and sectional side view of another electrical machine arrangement.

The electrical machine arrangement 100 further includes a stator arrangement 130. The stator arrangement 130 comprises an array of stator coils 131 arranged around an axis that is coaxial with the axes of rotation 140 of the rotors 110, 120. The stator arrangement 130 will typically also include a main stator structure (not shown), for example a magnetically permeable back iron with projecting teeth, with the stator coils wound around or affixed to the stator structure. An example is illustrated in FIG. 5A, described below.

The stator arrangement 130 is fixed relative to (e.g., attached to) an axially translating carriage 135 which may, for example, slide or otherwise move on rails (not shown). Utilizing an actuating mechanism, the carriage 135, and thereby the stator arrangement 130, can translate axially (i.e., move parallel to the axis 140). In a first axial position of the carriage 135, shown in FIG. 3A, the stator arrangement 130 is located such that the array of stator coils 131 is radially aligned with the array of rotor elements 111 of the first rotor 110. In this position, the rotor 110 and the stator arrangement 130 form an electrical machine that is drivingly coupled with the first spool (e.g., the LP/IP spool). In a second axial position of the carriage 135, shown in FIG. 3B, the stator arrangement 130 is located such that the array of stator coils 131 is radially aligned with the array of rotor elements 121 of the second rotor 120. In this position, the rotor 120 and the stator arrangement 130 form an electrical machine that is drivingly coupled with the second spool (e.g., the HP spool).

Thus, the electrical machine arrangement 100 provides an electrical machine that may be connected to either the LP/IP spool or the HP spool, depending on the desired mode of operation. For example, the electrical machine arrangement 100 may be connected to the HP spool for engine starting, but then connected to the LP/IP spool thereafter for generating electrical power. Compared with the "dual-spool" power offtake systems described above, any power converters (e.g., AC:DC converters) and cabling that serve the HP spool (e.g., for engine starting) also serve the LP/IP spool (e.g., for power generation), reducing the duplication of components and the associated mass. Furthermore, the use of an axially translating stator arrangement 130 and two rotors 110, 120 avoids any need to mechanically disconnect a rotor from one spool and then reconnect the rotor to another spool rotating at a different speed. This avoids the need for speed matching mechanisms, for example complex gearing, clutches and/or freewheel arrangements.

Figure 4:
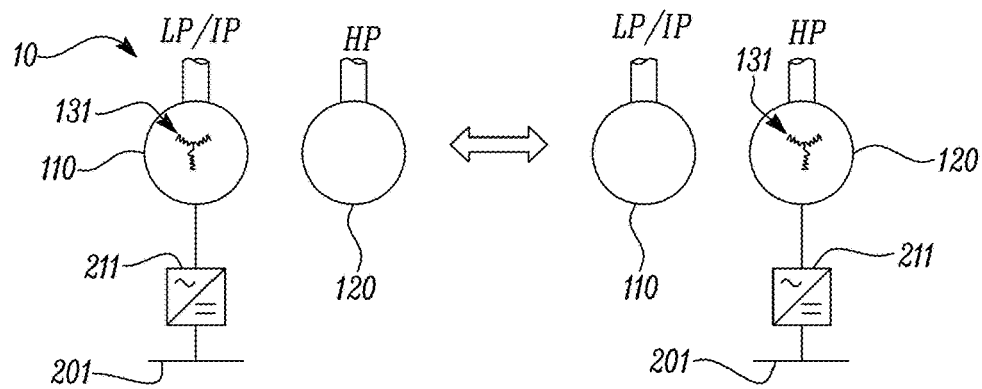
FIG. 4 is a schematic illustration of how a gas turbine engine comprising the electrical machine arrangement of FIGS. 3A-3B may be reconfigured.

Turning to FIG. 4, this schematically illustrates the gas turbine engine 10 of FIG. 2 and its operation in the two described modes. In the left-hand side of FIG. 4 the electrical machine arrangement 100 is in the first axial position. Here, the stator coils 131 interact with the rotor elements 111 of the first rotor 110 to form an electrical machine coupled to the LP/IP shaft 26. In the right-hand side of FIG. 4, the stator arrangement 130 has axially translated relative to the rotors 110, 120 so that the electrical machine arrangement 100 is in the second axial position. Here, the stator coils 131 interact with the rotor elements 121 of the second rotor 120 to form an electrical machine coupled to the HP shaft 27.

In FIG. 4, the stator coils 131 of the electrical machine arrangement 100 are shown to interface with a DC power channel 201 via an AC:DC power converter 211. When operating as a generator, the stator coils 131 of the electrical machine arrangement 100 supply power to the DC power channel 201 via the AC:DC power converter 211. When operating as a motor (e.g., for engine start), the stator coils 131 of the electrical machine arrangement 100 are supplied with power from the DC power channel 201 via the AC:DC power converter 211. It can be appreciated from FIG. 4 that the same AC:DC power converter 211 may be utilized for operation in both the first and second axial positions, eliminating the need to provide separate AC:DC power converters for both the LP/IP and HP spools.

Figure 5B:
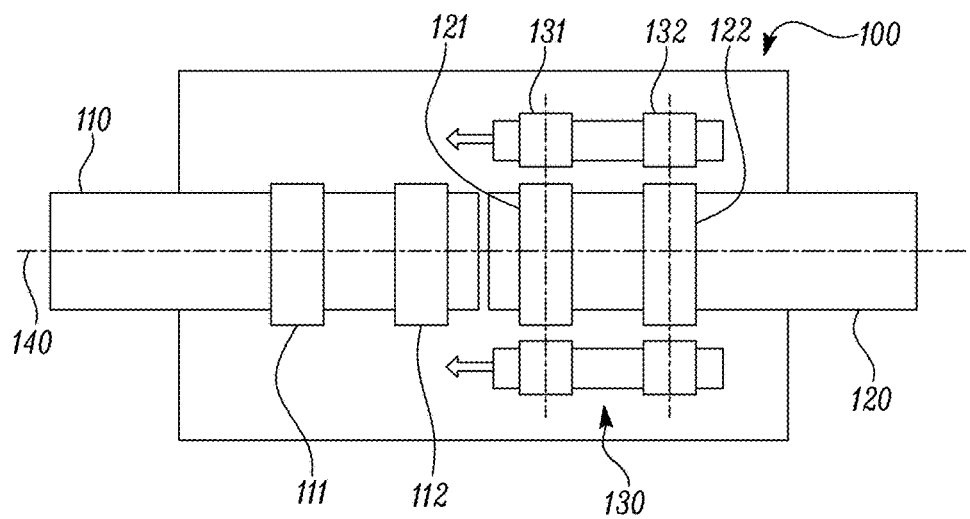
FIG. 5B shows the electrical machine arrangement of FIG. 5B with the stator arrangement in another axial position.
Figure 5C:
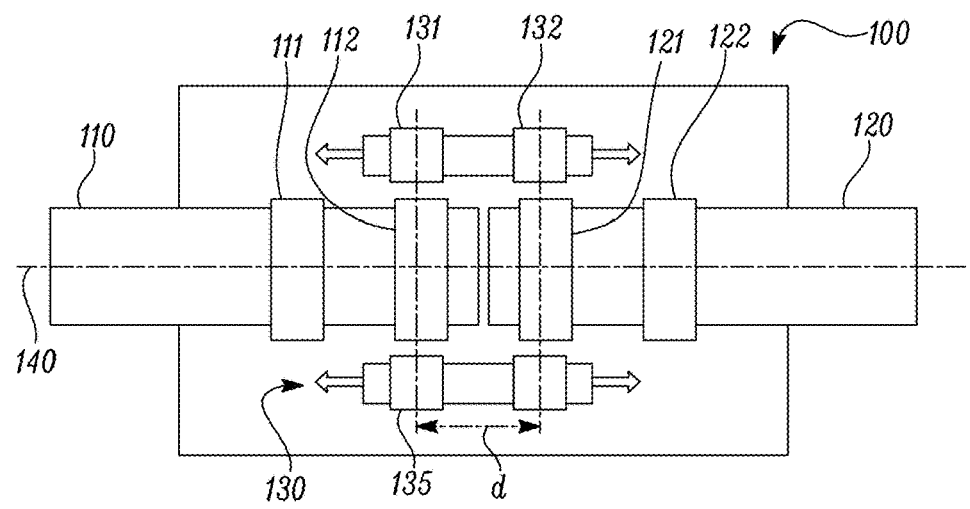
FIG. 5C shows the electrical machine arrangement of FIGS. 5A-5B with the stator arrangement in another axial position.

FIGS. 5A-5C illustrate a second example of the electrical machine arrangement 100 of FIG. 2. The electrical machine arrangement 100 of FIG. 5A-5C shares many of the same features as the electrical machine arrangement 100 of FIGS. 3A-3B and like reference numbers indicate like features. FIG. 5A-5C all show the same electrical machine arrangement 100 and differ only in the axial position of a stator arrangement 130.

Like the electrical machine arrangement 100 of FIGS. 3A-3B, the electrical machine arrangement 100 of FIGS. 5A-5C includes a first rotor 110 and a second rotor 120. The first rotor 110 is drivingly coupled to a first spool of the gas turbine engine (e.g., the LP or IP spool) and the second rotor 120 is drivingly coupled to a second spool of the gas turbine engine (e.g., the HP spool). The rotors 110, 120 have coaxial axes of rotation 140 and are axially spaced on the axis of rotation 140.

A radially outer side (e.g., surface) of the first rotor 110 carries a first array of electrical machine rotor elements 111 arranged around the axis of rotation 140, and a second array of electrical machine rotor elements 112 arranged around the axis of rotation 140 and axially spaced from the first array 111. Similarly, a radially outer side (e.g., surface) of the second rotor 120 carries a third array of electrical machine rotor elements 121 arranged around the axis of rotation 140, and a fourth array of electrical machine rotor elements 122 arranged around the axis of rotation 140 and axially spaced from the first array 121. The second and third arrays of rotor elements 112, 121 are located axially between the first and fourth arrays 111, 122. As before, the rotor elements 111, 112, 121, 122 may be permanent magnets or rotor coils.

The electrical machine arrangement 100 further includes a stator arrangement 130. The stator arrangement 130 comprises a first array of stator coils 131 arranged around the axis 140 and a second array of stator coils 132 arranged around the axis 140 and axially spaced from the first array of stator coils 131. An axial distance, d, separating the first and second arrays of stator coils 131, 132 is approximately equal to an axial distance separating the first and second arrays of rotor elements 111, 112, an axial distance separating the third and fourth arrays of rotor elements 121, 122 and, optionally, an axial distance separating the second and third arrays of rotor elements 112, 121.

The stator arrangement 130 will typically also include, for each of the first and second arrays of stator coils 131, 132, a main stator structure (not shown). The main stator structure may, for example, comprise a magnetically permeable back iron with projecting teeth, with the respective arrays of stator coils 131, 132 wound around or affixed to the respective stator structure. In some examples, the main stator structures of the two arrays may be integrally formed or attached to one another to reduce part count and/or reduce mass.

As in FIGS. 3A-3B, the stator arrangement 130 is fixed relative to (e.g., attached to) an axially translating carriage 135 whose axial position may be controlled by a controller 150, for example based on one or more monitored operating parameters (e.g., thrust, surge margin and/or electrical power demand). In a first axial position, shown in FIG. 5A, the stator arrangement 130 is located such that the first array of stator coils 131 is radially aligned with the first array of rotor elements 111, and the second array of stator coils 132 is radially aligned with the second array of rotor elements 112. In this position, the rotor 110 and the stator arrangement 130 form a two-channel electrical machine that is drivingly coupled with the first spool (e.g., the LP/IP spool). In a second axial position, shown in FIG. 5B, the stator arrangement 130 is located such that the first array of stator coils 131 is radially aligned with the third array of rotor elements 121, and the second array of stator coils 132 is radially aligned with the fourth array of rotor elements 122. In this position, the second rotor 120 and the stator arrangement 130 form a two-channel electrical machine that is drivingly coupled with the second spool (e.g., the HP spool).

Where the axial distance, d, separating the first and second arrays of stator coils 131, 132 is approximately equal to that separating the second and third arrays of rotor elements 112, 121, the stator arrangement 130 may also be controlled to stop in a third position, shown in FIG. 5C, that is axially between the first and second positions. In the third axial position, the stator arrangement 130 is located such that the first array of stator coils 131 is radially aligned with the second array of rotor elements 112, and the second array of stator coils 132 is radially aligned with the third array of rotor elements 121. In this position, the rotor 110 and the stator arrangement 130 form two one-channel electrical machines in which one is drivingly coupled with the first spool (e.g., the LP/IP spool) and one is drivingly coupled with the second spool (e.g., the HP spool). Thus, in the third axial position, it is possible to simultaneously generate power from both the first and second spool, to simultaneously motor both the first and second spool, or generate power from one spool and motor the other spool.

Compared with the example of FIGS. 3A-3B, the electrical machine arrangement 100 of FIGS. 5A-5B has, as well as the additional operating modes provided by the third axial position, improved fault tolerance. For example, in the event of a fault in one of the stator coils arrays (e.g., the first array 131), an AC:DC power converter connected thereto, or a power channel connected thereto, the second array of stator coils 132 can continue to provide, e.g., electrical power generation.

Figure 6:
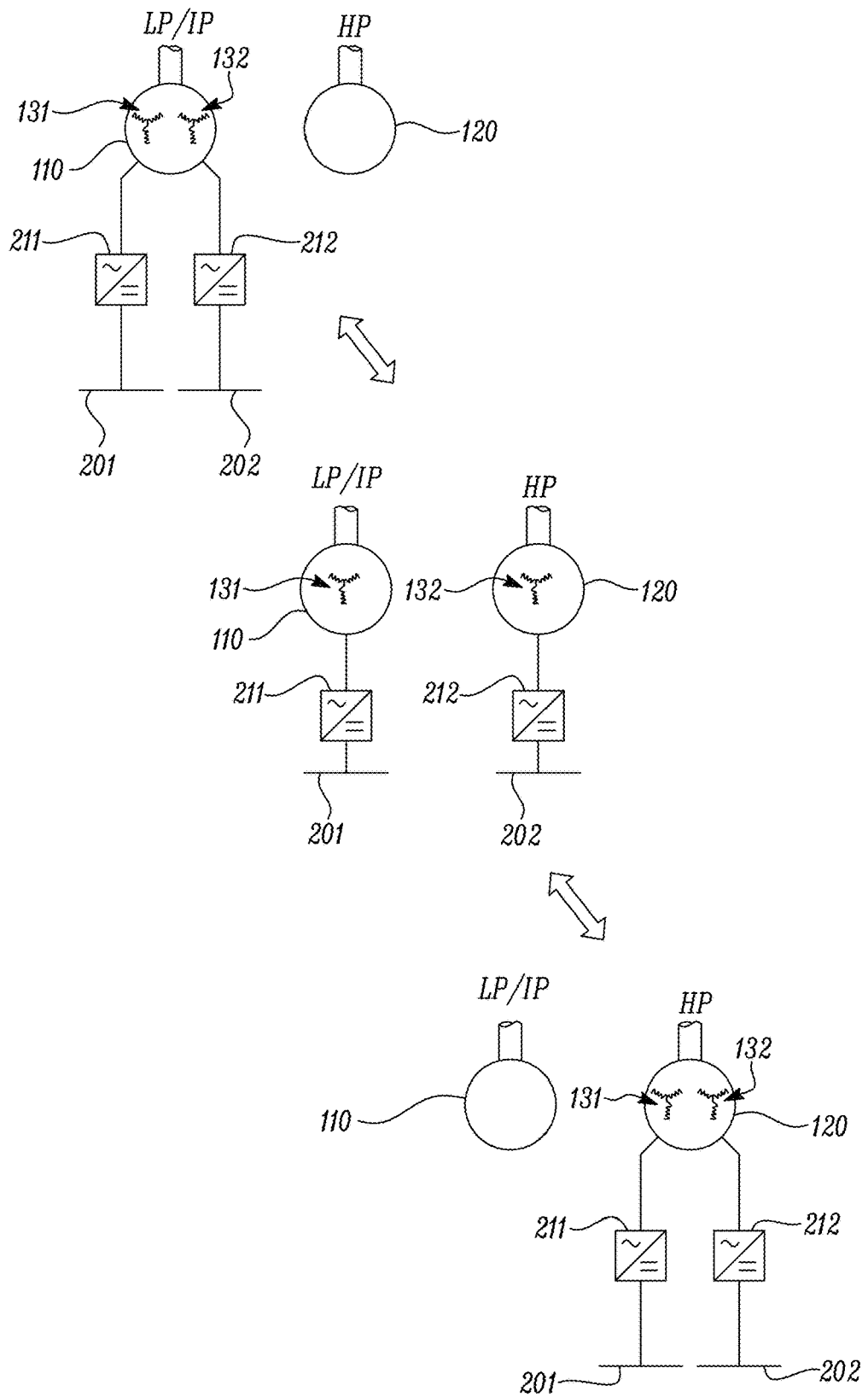
FIG. 6 is a schematic illustration of how a gas turbine engine comprising the electrical machine arrangement of FIGS. 5A-5C may be reconfigured.

Turning to FIG. 6, this schematically illustrates the gas turbine engine 10 of FIG. 2, comprising the electrical machine arrangement of FIGS. 5A-5C and its operation in the three described modes.

In the top-most drawing of FIG. 6, the electrical machine arrangement 100 is in the first axial position. Here, the first array of stator coils 131 interacts with the first array of rotor elements 111 and the second array of stator coils 132 interacts with the second array of rotor elements 112. The stator arrangement 130 and the first rotor 110 therefore form a two-channel electrical machine coupled to the LP/IP shaft 26. The first channel, provided by the first array of stator coils 131, is connected to a first DC power channel 201 by a first DC: AC converter 211. The second channel, provided by the second array of stator coils 132, is connected to a second DC power channel 202 by a second DC: AC converter 212.

In the bottom-most drawing of FIG. 6, the electrical machine arrangement 100 is in the second axial position. Here, the first array of stator coils 131 interacts with the third array of rotor elements 121 and the second array of stator coils 132 interacts with the fourth of array rotor elements 122. The stator arrangement 130 and the second rotor 120 therefore form a two-channel electrical machine coupled to the HP shaft 26. The same AC:DC converters 211, 212 and power channels 201, 202 are used when interfacing with the HP shaft 27 and LP shaft 26, reducing duplication of components.

In the middle drawing of FIG. 6, the electrical machine arrangement 100 is in the third axial position. Here, the first array of stator coils 131 interacts with the second array rotor elements 112 and the second array of stator coils 132 interacts with the third array rotor elements 121. The stator arrangement 130, the first rotor 110 and the second rotor 120 therefore form a two one-channel electrical machines, with one coupled to the LP/IP shaft 26 and one coupled to the HP shaft 27.

The third axial position of the stator arrangement 130 may be used for several different operations. In a first example, the second axial position (HP shaft) may initially be used to start the engine 10, and the third axial position (LP/IP shaft and HP shaft) may be used after engine start but before the engine power is great enough to generate sufficient power from only the LP shaft. Once the engine power is great enough, the axial position may be changed from the third position to the first position. In a second example, the first axial position (LP/IP shaft) may be used to generate electrical power during steady state flight of the aircraft, and the third axial position (LP/IP shaft and HP shaft) may be used to generate power during changes in engine operating point so that neither spool is too heavily loaded during the change. In a third example, the third axial position (LP/IP shaft and HP shaft) may be used to transfer power between the LP/IP and HP shafts, by operating one of the two channels in a motor mode and one of the two channels in a generator mode. In this case, the two power channels 201, 202 may be connected (e.g., by a bus tie).

Various modifications may be made to the examples of FIGS. 3 to 6 without departing from the invention. For example:

In the illustrated examples, the rotors 110, 120 carry their rotor elements 111, 112, 121, 122 on a radially outer side (e.g., radially outer surface) of the rotor and the stator coils 131, 132 are located radially outward of the rotor elements 111, 112, 121, 122. It is however envisaged that the rotors 110, 120 may instead carry their rotor elements 111, 112, 121, 122 on a radially inner side (e.g., surface) of the rotor and the stator coils 131, 132 may instead be located radially inward of the rotor elements 111, 112, 121, 122. In other words, while in-runner electrical machine arrangements 100 are illustrated, an out-runner electrical machine arrangement could be used instead.

In the illustrated example, each array of stator coils 131, 132 is radially aligned with a respective array of rotor elements 111, 112, 121, 122 in each of the first, second and third axial positions. In other words, the stator coils 131, 132 and rotor elements 111, 112, 121, 122 form radial flux electrical machines (i.e., there is a radial air gap between the rotor elements 111, 112, 121, 122 and the stator coils 131, 132). It is, however, contemplated that the stator coils 131, 132 and rotor elements 111, 112, 121, 122 may instead form axial flux electrical machines. For example, the rotor elements 111, 112, 121, 122 and stator coils 131, 132, rather than being located on a radially outer/inner facing surface, may instead be circumferentially arranged around the axis of rotation 140 on an axially facing surface. For each of the axial positions, the stator arrangement 130 may stop axially short of the rotor elements 111, 112, 121, 122 such that an axial air gap is left between the stator coils 131, 132 and the rotor elements 111, 112, 121, 122. In this way, the stator coils 131, 132 and rotor elements 111, 112, 121, 122 would form axial flux machines.

In the illustrated examples, the stator arrangement 130 moves axially and the rotors 110, 120 are axially fixed. It is envisaged that the stator arrangement 130 may instead be axially fixed, and the rotors may be moveable along their axes of rotation 140 between the axial positions. In other words, any mechanism for providing relative axial movement between the rotors 110, 120 and the stator arrangement 130 may be used.

As noted above, aerospace applications may have relatively high fault tolerance requirements. To this end, a higher level of fault tolerance may be achieved by providing each stator coil array 131, 132 in the form of a plurality of electrically isolated polyphase winding sets. Examples of this are described with reference to FIGS. 7A and 7B.

Figure 7A:
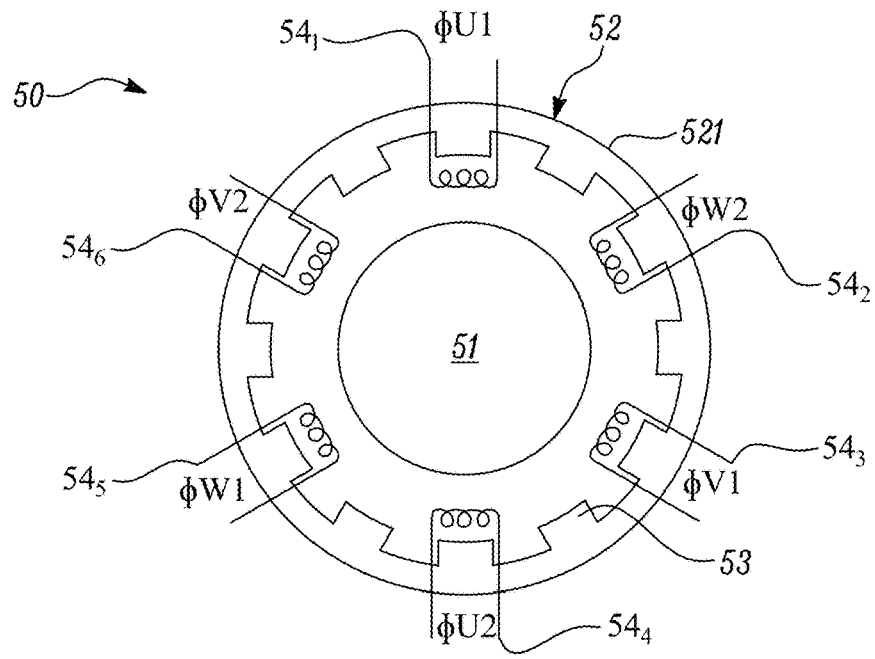
FIG. 7A is partially schematic axial view of an electrical machine with two electrically isolated polyphase winding sets.

FIG. 7A illustrates a permanent magnet radial flux electrical machine 50. The electrical machine 50 has a rotor 51 and a stator 52 that radially surrounds the rotor, though, as noted above, the rotor 51 could instead radially surround the stator 52. A surface of the rotor 51 facing the stator 52 carries rotor elements (e.g., permanent magnets) for interaction with the stator 52. The stator 52 has a generally annular back iron 521 and a plurality of teeth 53 that extend radially from the back iron 521 and are evenly distributed about the circumference of the stator 52. The stator 52 further includes two electrically independent three-phase winding sets, the coils of which are wound around the teeth 53. In FIG. 7A the two winding sets are designated "1" and "2", and the three phases are designated "U", "V" and "W". Thus, the first three-phase winding set has phases U1, V1, W1 and these are associated with the coils $54_1$, $54_3$, $54_5$. The second winding set has phases U2, V2, W2 and these are associated with the coils $54_2$, $54_4$, $54_6$.

The coils $54_1$, $54_3$, $54_5$ that form the first winding set are electrically connected, for example in a star or delta configuration. Likewise, the coils $54_2$, $54_4$, $54_6$ that form the second winding set are electrically connected, for example in a star or delta configuration. However, to ensure the first and second winding sets are electrically isolated, the first set of coils $54_1$, $54_3$, $54_5$ are not electrically connected with the second set of coils $54_2$, $54_4$, $54_6$. Thus, if there is an electrical fault (e.g., a phase fault) in one of the winding sets, the fault should not electrically propagate to the other winding set. A fault in one winding set that, e.g., requires disconnection of the winding set from the wider power system does not prevent the motor 50 from operating, and with suitable overrating of the electrical machine 50, it may continue operation at full or close to full rated power.

In the present example, the circumferentially adjacent coils (e.g., coils $54_1$, $54_2$) belong to different winding sets. In other examples, including that shown in FIG. 7B, the circumference of the stator is divided into arcuate sectors, the angular size of each sector being 360°/N where N is the number of winding sets, and each winding set occupies one of the N sectors. In the present example, a concentrated winding scheme is applied, and a coil is wound around every second stator tooth 53 so that an unwound tooth separates circumferentially adjacent coils. This is not essential, but increases the thermal, mechanical and magnetic isolation between the two winding sets and thus further reduces the risk of fault propagation.

Figure 7B:
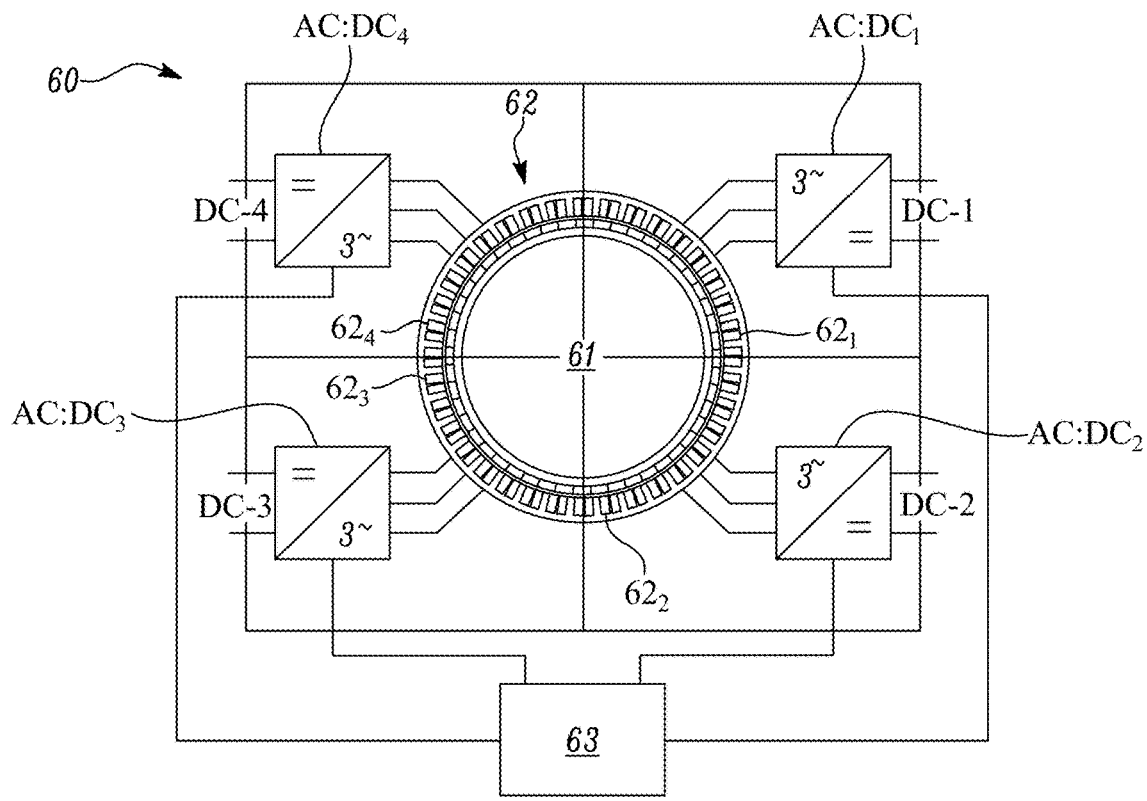
FIG. 7B is partially schematic axial view of an electrical machine with four electrically isolated polyphase winding sets.

FIG. 7B illustrates another permanent magnet radial flux electrical machine 60. The electrical machine includes a rotor 61 and a stator 62 radially outward of the rotor 61. The rotor 61 carries a circumferential array of rotor elements, for example permanent magnets, on a radially outer surface. The stator 62 comprises an annular back iron from which a plurality of evenly distributed stator teeth radially project. The full circumference of the stator 62 is divided into N=4 arcuate sectors, each subtending an angle of 360°/N=360°/4=90°. The stator further comprises N=4 electrically isolated polyphase winding sets $62_1$, $62_2$, $62_3$, $62_4$, each comprising one or more coils. Each polyphase winding set (e.g., $62_1$) occupies (e.g., is wound around the teeth of) one of the four sectors.

The coils that form the first winding set $62_1$ are electrically connected, for example in a star or delta configuration. Likewise, the coils that form the second winding set $62_2$ are electrically connected, for example in a star or delta configuration, and so forth. However, to ensure the first to fourth winding sets are electrically isolated, the coils of each winding set are electrically isolated from the coils of every other winding set. Thus, if there is an electrical fault (e.g., a phase fault) in one of the winding sets, the fault should not electrically propagate to the other winding sets.

FIG. 7B further shows that each of the polyphase winding sets $62_{1-4}$ is connected to the AC side of an AC:DC power converter $AC:DC_{1-4}$. The DC sides of the power converters $AC:DC_{1-4}$ may interface with one or more DC power channels. A common controller 63 for the AC:DC power converters $AC:DC_{1-4}$ is also shown.

Figure 8:
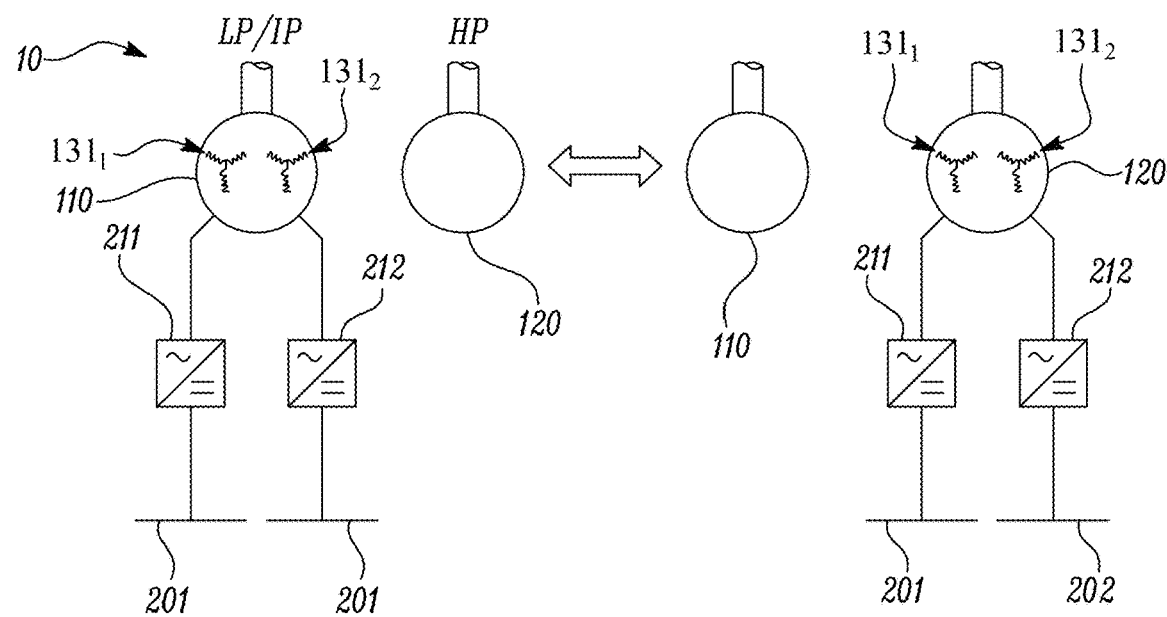
FIG. 8 is a schematic illustration of how a gas turbine engine with an electrical machine arrangement with may be reconfigured.

FIG. 8 schematically illustrates a gas turbine engine 10 that has the electrical machine arrangement 100 of FIGS. 3A-3B and utilizes a stator coil array 131 that includes two electrically isolated polyphase winding sets $131_1$, $131_2$. Thus, the arrangement of FIG. 8 is the same as that shown in FIG. 4 but provides a higher level of fault tolerance. The stator arrangement 130 may, for example, be that of FIG. 7A.

In the left-hand side of FIG. 8, the electrical machine arrangement 100 is in the first axial position. Here, the stator coils of the first and second polyphase winding sets $131_1$, $131_2$ interact with the rotor elements 111 of the first rotor 110 and therefore form an electrical machine, having two electrically independent channels, coupled to the LP/IP shaft 26.

In the right-hand side of FIG. 8, the stator arrangement 130 has axially translated relative to the rotors 110, 120 so that the electrical machine arrangement 100 is in the second axial position. Here, the stator coils of the first and second polyphase winding sets $131_1$, $131_2$ interact with the rotor elements 121 of the second rotor 120 and therefore form an electrical machine, having two electrically independent channels, coupled to the HP shaft 27.

The first polyphase winding set $131_1$ is connected to a first DC power channel 201 via a first AC:DC power converter 211. The second polyphase winding set $131_2$ is connected to a second DC power channel 202 via a second AC:DC power converter 212. Thus, the engine 10 of FIG. 8 has two electrically independent power lanes: a first power lane comprising the first polyphase winding set $131_1$, the first AC:DC power converter 211 and the first DC power channel 201; and a second power lane comprising the second polyphase winding set $131_2$, the second AC:DC power converter 212 and the first DC power channel 202. An electrical fault in any of the components of the first power lane should not affect the second power lane, and vice versa. In another example, there is only one DC power channel and the two winding sets $131_1$, $131_2$ are connected to the single DC power channel.

Figure 9:
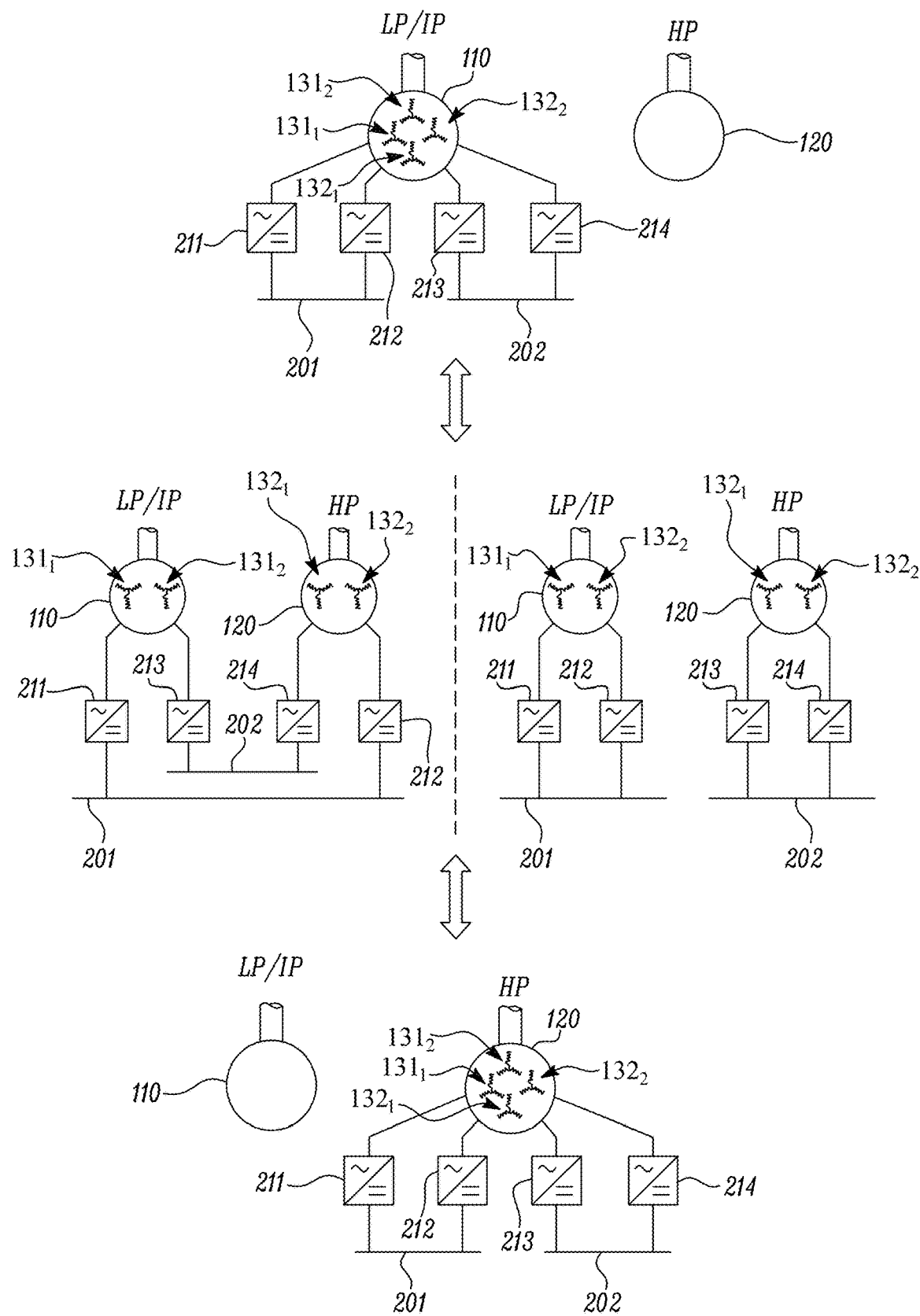
FIG. 9 is another schematic illustration of how a gas turbine engine with an electrical machine arrangement may be reconfigured.

FIG. 9 schematically illustrates a gas turbine engine 10 that has the electrical machine arrangement 100 of FIGS. 5A-C and utilizes stator coil arrays 131, 132 that each include two electrically isolated polyphase winding sets $131_{1-2}$, $132_{1-2}$. Thus, the arrangement of FIG. 9 is the same as that shown in FIG. 6 but provides a higher level of fault tolerance. The stator arrangement 130 may, for example, comprise two of the stators 50 illustrated in FIG. 7A.

In the top-most drawing of FIG. 9, the stator arrangement 130 of the electrical machine arrangement 100 is in the first axial position. Here, the first array of stator coils 131, comprising first and second polyphase winding sets $131_1$, $131_2$, interacts with the first array of rotor elements 111. The second array of stator coils 132, comprising third and fourth polyphase winding sets $132_1$, $132_2$, interacts with the second array rotor elements 112. The stator arrangement 130 and the first rotor 110 therefore form a four-channel electrical machine coupled to the LP/IP shaft 26.

In the illustrated example, two of the four channels are electrically connected to a first DC power channel 201 via AC:DC converters 211, 212, and the remaining two channels are electrically connected to a second DC power channel 202 via AC:DC converters 213, 214. Thus, there are two redundantly supplied DC power channels. As discussed below, which winding sets $131_1$, $131_2$, $132_1$, $132_2$ are connected to which DC power channels 201, 202 may be varied according to the application requirements. In another example, there may be four DC power channels and each winding set $131_1$, $131_2$, $132_1$, $132_2$ is connected to one of the four power channels.

In the bottom-most drawing of FIG. 9, the stator arrangement 130 of the electrical machine arrangement 100 is in the second axial position. Here, the first array of stator coils 131, comprising first and second polyphase winding sets $131_1$, $131_2$, interacts with the third array of rotor elements 121. The second array of stator coils 132, comprising third and fourth polyphase winding sets $132_1$, $132_2$, interacts with the fourth array of rotor elements 122. The stator arrangement 130 and the second rotor 120 therefore form a four-channel electrical machine coupled to the HP shaft 27. As described above, the four channels of the electrical machine arrangement 100 are shown to be electrically connected to two DC power channels 201, 202 via AC:DC power converters 211-214, though in another example may be connected to four DC power channels.

In the middle drawing of FIG. 9, which shows two alternative options (to the left and the right of the dashed line), the stator arrangement 130 is in the third axial position. Here, the first array of stator coils 131, comprising first and second polyphase winding sets $131_1$, $131_2$, interacts with the second array rotor elements 112. The second array of stator coils 132, comprising third and fourth polyphase winding sets $132_1$, $132_2$, interacts with the third array rotor elements 121. The stator arrangement 130, the first rotor 110 and the second rotor 120 therefore form a pair of two-channel electrical machines, one coupled to the LP/IP shaft 26 and one channel coupled to the HP shaft 27. As described above, the four channels of the electrical machine arrangement 100 are shown to be electrically connected to two DC power channels 201, 202 via AC:DC power converters 211-214, though in another example may be connected to four DC power channels.

In the arrangement to the left of the dashed line, the first DC power channel 201 is electrically connected to the first polyphase winding set $131_1$ and the fourth polyphase winding set $132_2$, while the second DC power channel 202 is electrically connected to the second polyphase winding set $131_2$ and the third polyphase winding set $132_1$. Thus, each power channel 201, 202 is coupled to both the LP/IP shaft 26 and the HP shaft 27. Such an arrangement may have greater fault tolerance, as a fault affecting a rotor (e.g., a fault requiring disconnection of a rotor 110 from the main shaft 26) does not leave one of the power channels 201, 202 totally without a supply of electrical power.

In the arrangement to the right of the dashed line, the first DC power channel 201 is electrically connected to the first polyphase winding set $131_1$ and the second polyphase winding set 131₂, while the second DC power channel 202 is electrically connected to the third polyphase winding set 132₁ and the fourth polyphase winding set 132₂. Such an arrangement may have lower complexity than the arrangement to the left of the dashed line, as the AC:DC power converters 211, 212 associated with the first power channel 201 may receive electrical power of the same electrical frequency, and likewise for the AC:DC power converters 213, 214 associated with the second power channel 202. In contrast, in the arrangement to the left of the dashed line, the AC:DC power converters 211, 212 associated with the first power channel 201 receive power at different frequencies due to the different rotational speeds of the rotors 110, 120.

Figure 10:
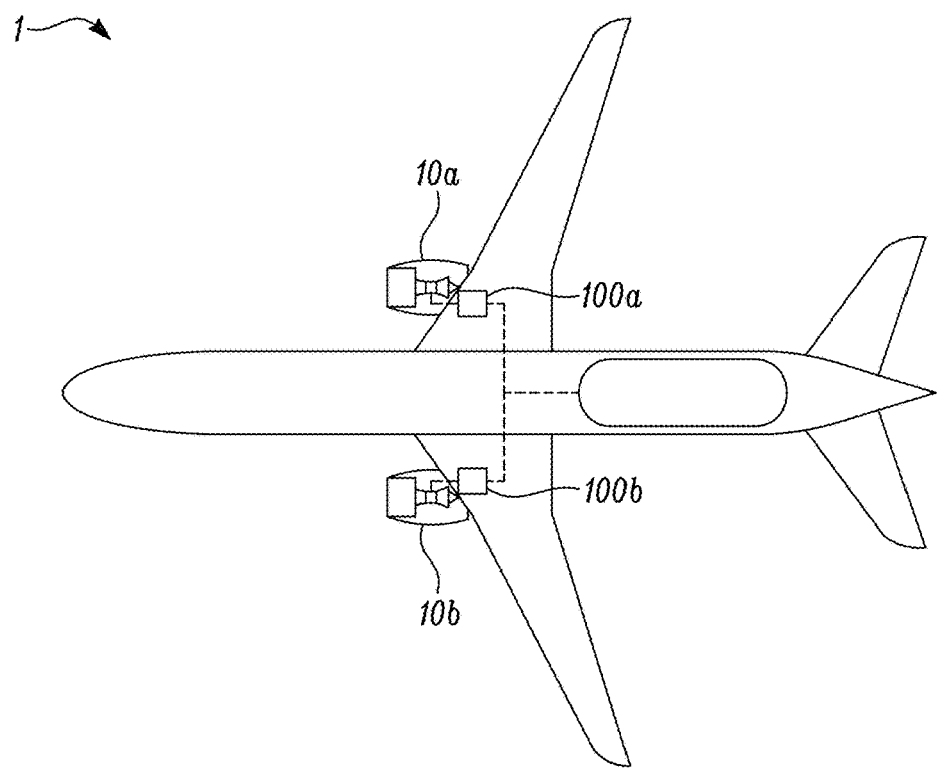
FIG. 10 is a plan view of an aircraft.

FIG. 10 is a plan view of an aircraft 1. The aircraft 1 has two propulsive gas turbine engines 10a, 10b, each of which has an electrical machine arrangement 100a, 100b. The gas turbine engines 10a, 10b may be of any configuration (e.g., two-spool, three-spool or geared). The electrical machine arrangements 100a, 100b may of the type shown in FIGS. 3A-3B or FIGS. 5A-5C. Each stator coil array 131, 132 may form one polyphase winding set or a plurality of electrically isolated polyphase winding sets.

It will be understood that the invention is not limited to the embodiments above-described and various modifications and improvements can be made without departing from the concepts herein. The invention has been described with reference to aerospace applications but could be used in other transport and non-transport applications. Except where mutually exclusive, any of the features may be employed separately or in combination with any other features and the disclosure extends to and includes all combinations and sub-combinations of one or more features described herein.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

I claim:

1. An aircraft gas turbine engine, comprising:
    a first spool comprising a first compressor and a first turbine drivingly coupled by a first main shaft;
    a second spool comprising a second compressor and a second turbine drivingly coupled by a second main shaft;
    a combustion equipment;
    an electrical machine arrangement comprising:
        a first rotor drivingly coupled to the first main shaft and carrying an array of rotor elements;
        a second rotor drivingly coupled to the second main shaft and carrying an array of rotor elements; and
        a stator arrangement comprising an array of stator coils arranged around an axis, the axis being coaxial with an axis of rotation of the first rotor and an axis of rotation of the second rotor,
    wherein the stator arrangement is axially translatable relative to the first and second rotors between:
        a first axial position in which the array of stator coils interacts with the array of rotor elements of the first rotor; and
        a second axial position in which the array of stator coils interacts with the array of rotor elements of the second rotor.

2. The gas turbine engine of claim 1, wherein in the first axial position, the array of stator coils is radially aligned with the array of rotor elements of the first rotor, and in the second axial position, the array of stator coils is radially aligned with the array of rotor elements of the second rotor.

3. The gas turbine engine of claim 1, wherein the electrical machine arrangement comprises an axially translating carriage, wherein the stator arrangement is fixed relative to the carriage.

4. The gas turbine engine of claim 1, wherein an axial position of the stator arrangement is fixed, and the first and second rotors are axially translatable along the axes of rotation.

5. The gas turbine engine of claim 1, wherein the array of stator coils comprises a plurality of electrically isolated polyphase winding sets.

6. The gas turbine engine of claim 5, wherein the array of stator coils comprises two or four electrically isolated polyphase winding sets.

7. The gas turbine engine of claim 5, wherein a circumference of the stator arrangement is divided into a plurality of sectors and each one of the plurality of electrically isolated polyphase winding sets occupies a respective one of the plurality of sectors.

8. The gas turbine engine of claim 5, wherein a first polyphase winding set of the plurality of polyphase winding sets is electrically connected to first DC power channel, and a second polyphase winding set of the plurality of polyphase winding sets is electrically connected to second DC power channel.

9. The gas turbine engine of claim 1, wherein:
    the first rotor carries a first array of rotor elements and a second array of rotor elements axially spaced from the first array of rotor elements;
    the second rotor carries a third array of rotor elements and a fourth array of rotor elements axially spaced from the third array of rotor elements;
    the array of stator coils is a first array of stator coils, and the stator arrangement further comprises a second array of stator coils arranged around the axis and axially spaced from the first array of stator coils;
    in the first axial position, the first array of stator coils interacts with the first array of rotor elements, and the second array of stator coils interacts with the second array of rotor elements; and
    in the second axial position, the first array of stator coils interacts with the third array of rotor elements, and the second array of stator coils interacts with the fourth array of rotor elements.

10. The gas turbine engine of claim 9, wherein the stator arrangement is axially translatable relative to the first and second rotors to:
    a third axial position axially between the first and second axial positions, in which the first array of stator coils interacts with the second array of rotor elements, and the second array of stator coils interacts with the third array of rotor elements.

11. The gas turbine engine of claim 9, wherein:
    the first array of stator coils is electrically connected to a first DC power channel; and
    the second array of stator coils is electrically connected to a second DC power channel.

12. The gas turbine engine of claim 9, wherein:
    the first array of stator coils comprises first and second electrically isolated polyphase winding sets; and
    the second array of stator coils comprises third and fourth electrically isolated polyphase winding sets.

13. The gas turbine engine of claim 1, wherein the rotor elements are permanent magnets.

14. The gas turbine engine of claim 1, further comprising a controller configured to control the axial position of the stator arrangement relative to the first and second rotors.

15. The gas turbine engine of claim 14, wherein the controller is configured to monitor one or more operating conditions of the gas turbine engine and to select an axial position based on the one or more operating conditions.

16. The gas turbine engine of claim 1, wherein:
the first spool is a low-pressure (LP) spool or an intermediate-pressure (IP) spool; and
the second spool is a high-pressure (HP) spool.

17. An aircraft comprising the gas turbine engine of claim 1.

18. An electrical machine arrangement for an aircraft gas turbine engine, comprising:
a first rotor configured to be coupled to a first main shaft of a gas turbine engine and carrying an array of rotor elements;
a second rotor configured to be coupled to a second main shaft of the gas turbine engine and carrying an array of rotor elements; and
a stator arrangement comprising an array of stator coils arranged around an axis, the axis being coaxial with an axis of rotation of the first rotor and an axis of rotation of the second rotor,
wherein the stator arrangement is axially translatable relative to the first and second rotors between:
a first axial position in which the array of stator coils interacts with the array of rotor elements of the first rotor; and
a second axial position in which the array of stator coils interacts with the array of rotor elements of the second rotor.

19. The electrical machine arrangement of claim 18, wherein:
the first rotor carries a first array of rotor elements and a second array of rotor elements axially spaced from the first array of rotor elements;
the second rotor carries a third array of rotor elements and a fourth array of rotor elements axially spaced from the third array of rotor elements;
the array of stator coils is a first array of stator coils, and the stator arrangement further comprises a second array of stator coils arranged around the axis and axially spaced from the first array of stator coils;
in the first axial position, the first array of stator coils interacts with the first array of rotor elements, and the second array of stator coils interacts with the second array of rotor elements;
in the second axial position, the first array of stator coils interacts with the third array of rotor elements, and the second array of stator coils interacts with the fourth array of rotor elements.

20. The electrical machine arrangement of claim 19, wherein the stator arrangement is axially translatable relative to the first and second rotors to:
a third axial position axially between the first and second axial positions, in which the first array of stator coils interacts with the second array of rotor elements, and the second array of stator coils interacts with the third array of rotor elements.

* * * * *